Jan. 14, 1947.    W. I. KELLY    2,414,106
CABLE CONNECTOR
Filed Jan. 18, 1944    2 Sheets-Sheet 1

INVENTOR.
WILLIAM I. KELLY
BY
William D Hall
Attorney

Jan. 14, 1947.  W. I. KELLY  2,414,106
CABLE CONNECTOR
Filed Jan. 18, 1944  2 Sheets-Sheet 2

INVENTOR.
WILLIAM I. KELLY
BY
William D Hall
Attorney.

Patented Jan. 14, 1947

2,414,106

UNITED STATES PATENT OFFICE 2,414,106

CABLE CONNECTOR

William I. Kelly, Eatontown, N. J., assignor to the United States of America, as represented by the Secretary of War Application January 18, 1944, Serial No. 518,691

6 Claims. (Cl. 174—91)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to cable connectors.

It is an object of my invention to provide a connector for electrical cable which is waterproof and dirtproof and which grips the cables so as to avoid strain upon and breakage, within the body of the connector, of the individual conductors of the cable.

It is a further object to design a connector which is well adapted to multiconductor cable, such as is used in radio equipment and the like, and which is easily installed.

Another object is to provide a cable connector wherein the cables and the individual conductors of said cables are not strained or short circuited as a result of twisting, the parts being so arranged as to allow installation of the cables and coupling of the connector by longitudinal movement rather than by rotation.

Still another object is to arrange the parts of a connector so that, by a simple substitution of some of the parts, the connector may be readily adapted for different diameter cables and for cables of the same diameter but having different sizes and numbers of conductors.

It is also an object to provide a connector of the type hereinafter described which will be relatively inexpensive to manufacture.

Other objects will become apparent, and the various features of my invention will be fully understood, from the following description and the drawings.

Figure 2:
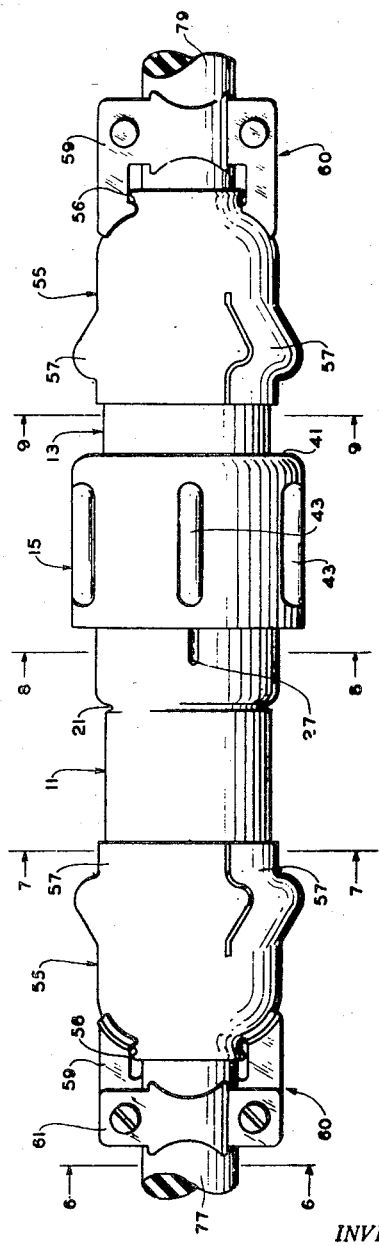
Figure 2 is an elevational view of the connector of Figure 1.

Figures 6, 7, 8 and 9 are transverse cross-sections, along the lines 6—6, 7—7, 8—8 and 9—9, respectively, of Figure 2.

Figure 1:
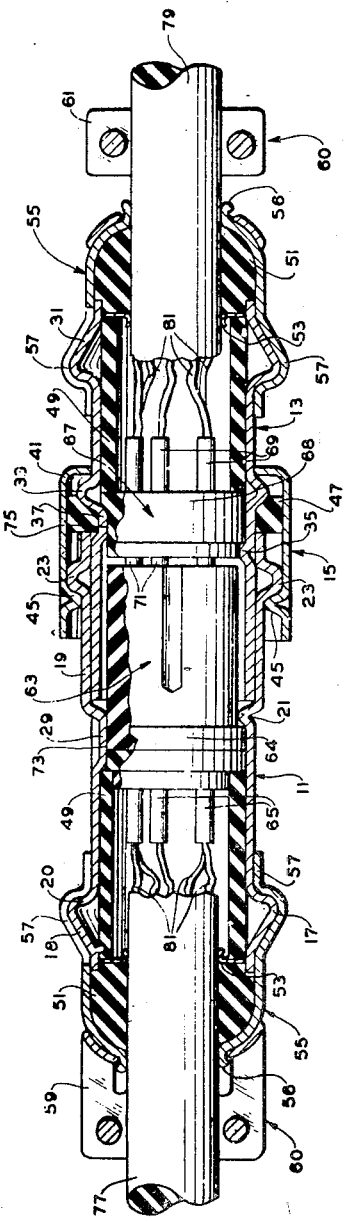
Figure 1 is a longitudinal cross-sectional view of a connector embodying my invention.

For convenience, in the following description I shall use the terms "left" and "right" to indicate the parts as disposed in Figures 1 and 2. Also, the term "inner" will indicate the central portion of the connector, in the vicinity of the coupling collar 15, and "outer" will indicate parts disposed to the left and right of said "inner" portion. The connector shown in the drawings comprises a metal female housing 11 and a metal male housing 13, said housings being coupled together by a metal coupling collar 15.

Figure 3:
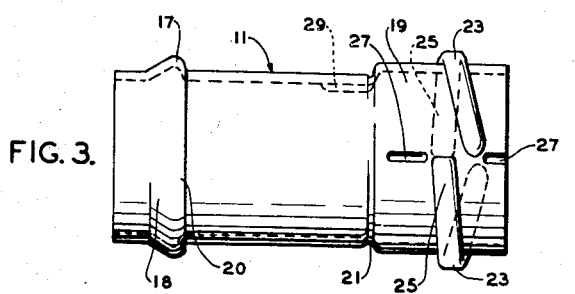
Figures 3 and 4 are front elevational and right end elevational views, respectively, of the female housing of Figure 2.
Figure 4:
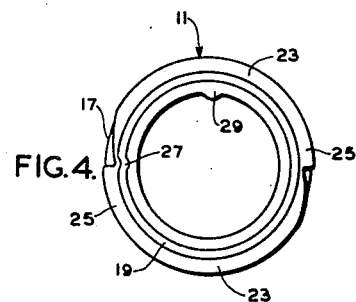

The female housing 11 (see particularly Figures 3 and 4) is tubular. Near its outer, or left, end it has an outwardly extending circumferential ridge 17. In cross-section, the left wall 18 of said ridge 17 is angulated, whereas the right wall 20 is substantially vertical. The right, or inner, end portion 19 of the female housing 11, which is of slightly larger diameter, is delimited by an inwardly extending, circumferential ridge 21. Said right end portion 19 is embossed so as to have two, outwardly extending, diametrically opposed, screw thread type, cams 23, each of which extends 180° around the housing 11. Each cam has a decreased pitch through about the last 60° of its length, at its left end 25. Said female housing 11 is also embossed so as to provide inwardly extending, longitudinally disposed, tongues 27 and 29.

The male housing 13 (see particularly Figure 1) is also tubular. It has two outwardly extending, circumferential ridges 31 and 33, an inwardly extending, circumferential ridge 35 and two inwardly extending, longitudinally disposed, tongues 37 and 39 (see Figure 8). The ridge 31 is similar to the ridge 17, as described above.

Figure 5:
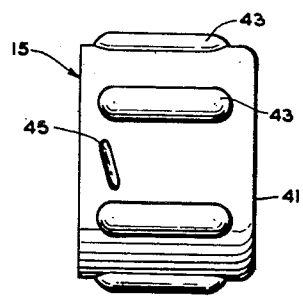
Figure 5 is a top view of the coupling collar of Figure 2.
Figure 6:
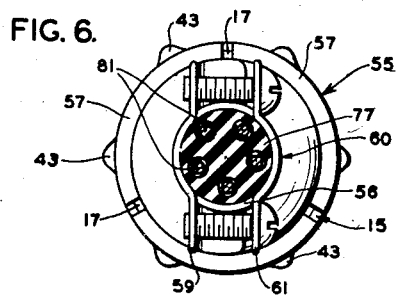
Figure 7:
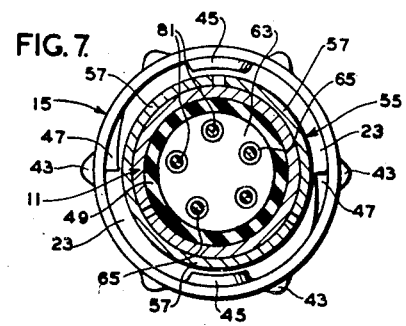
Figure 8:
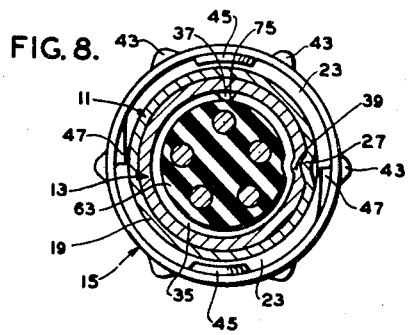
Figure 9:
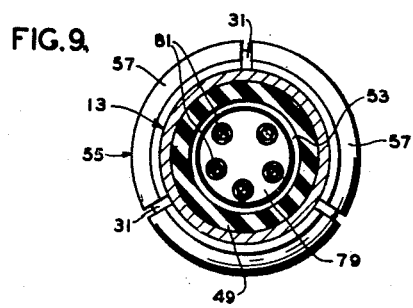

The coupling collar 15 (see particularly Figures 1 and 5) is also tubular. Its right end 41 is turned inwardly and encircles the male housing 13 to the right of the ridge 33. Said collar 15 is provided with a plurality of outwardly extending, longitudinally disposed, ribs 43 for manual operation and two, inwardly extending, angularly disposed, flanges 45 which cooperate with the two cams 23 mentioned above. The coupling collar 15 is provided with an annular, resilient gasket 47, of rubber or the like, which fits inside the coupling collar and encircles the male housing 13 to the left of the ridge 33.

The outer ends of the female and male housings 11, 13 are each fitted with a tubular insulating bushing 49, an annular resilient grommet 51 of rubber or the like, a metal washer 53 of J shaped cross section, and a metal housing cap 55. Each housing cap 55 has a cable inlet 56 with a rounded lip at its outer end, and each cap is slotted longitudinally at its inner end, so as to form three radially resilient fingers 57. Said fingers 57 are of a shape to allow them to be readily snapped over the ridges 17, 31, at the outer ends of the housings 11, 13, respectively, and to make a snug fit thereon. The shape of said ridges 17, 31, as already described, makes it easy to slidably attach the caps 55 but more difficult to slidably remove them. To each of the housing caps 55 is welded the stationary part 59 of a cable clamp 60, to which is attached, by two machine screws, the removable part 61 of the said cable clamp.

Within my connector may be any suitable type of electrical plugs, the plugs 63, 67 shown in the drawings being of a frictional pin type. The female plug 63 is provided, at its left end, with a plurality of solder lugs 65 and at its right end with a plurality of female friction contacts (not shown). The male plug 67 is provided, at its right end, with a plurality of solder lugs 69 and at its left end with a plurality of male friction contact pins 71. Each plug 63, 67, at its outer end 64, 68, is of an increased diameter, being larger than the inwardly extending ridges 21, 35 of the female and male housings 11, 13, respectively, so that said plugs 63, 67 will be retained within the said housings when the connector is uncoupled. Each plug 63, 67 also has a longitudinal groove 73, 75 to cooperate with the inwardly extending tongues 29, 37, respectively, of the housings 11, 13.

In the drawings my connector is shown joining two lengths of multiconductor cable 77, 79, carrying the individual metal conductors 81.

To use my connector, as above described, a housing cap 55, grommet 51, washer 53 and insulating bushing 49 are slipped over the ends of each of the lengths of cable 77, 79 which are to be joined. The individual conductors 81 of each cable 77, 79 are then soldered to the several soldering lugs 65, 69 of the plugs 63, 67. The female and male housings 11, 13 may then be slipped into place over the plugs 63, 67, respectively. The bushings 49, washers 53 and grommets 51 are then pushed inward along the cables 77, 79 and the housing caps 55 are snapped over the outer ends of said housings 11, 13 and the cable clamps 60 tightened up on said cables. The female and male plugs 63, 67 may then be pressed together, the contact pins 71 and the female friction contacts making electrical contact, and the female and male housings 11, 13 may be coupled together by rotating the coupling collar 15.

The inlets 56 of the housing caps 55 and the washers 53 are rounded where they come into contact with the cables 77, 79 so as to cause no abrasion thereof. The insulating bushings 49 keep the conductors 81 from coming into contact with the housings 11, 13.

The only points of possible leakage of water into my connector will be between the outer ends of the female and male housings 11, 13 and the cables 77, 79 and at the junction between said housings. These points, however, have been made leakproof by the grommets 51 and the gasket 47. The pressure on each grommet 51, which will be compressed between one of the housings 11, 13, a washer 53, a housing cap 55 and one of the cables 77, 79, will be such as to cause it to tightly grip the cable 77 or 79 and prevent leakage between the grommet and the cable. Each grommet 51 will also be pressed against the outer end of one of the housings 11, 13 so as to prevent leakage there. This gripping of the cables 77, 79 by the grommets 51 and the further gripping of said cables by the cable clamps 60 will securely retain the ends of the cables and avoid any breakage within the connector due to pulling or twisting of the conductors 81. The cable clamps 60, being spaced from the housing caps 55, prevent movement of the cables 77, 79 where they pass through the grommets 51 and therefore further assist in preventing leakage between the grommets and the cables. All of the metal parts of my connector should preferably be of rust resistant material.

The junction of the housings 11, 13 will be securely sealed by the gasket 47, which will be constricted between the right end of the female housing 11, the ridge 33 of the male housing 13 and the inside of the coupling collar 15. Increased pressure, to assure a tight fit here, is obtained by the decreased pitch of the cams 23 at their left ends 25, as mentioned above. This decreased pitch also helps to prevent accidental opening of the connector while in use. Tests conducted upon my connector, as described above, have indicated that it is entirely waterproof even under pressure and for considerable periods of time.

The female and male housings 11, 13 are prevented from rotating relative to each other by the tongues 27, 39. The plugs 63, 67 are prevented from rotating within said housings 11, 13 by the grooves 73, 75 and the tongues 29, 37. This absence of relative rotation of the housings and plugs avoid twisting of the cables 77, 79 or their conductors 81. Also the housing caps 55 are attached to the housings 11, 13 without any rotation of the parts. The ridges 21, 35 of the female and male housings 11, 13, respectively, retain the plugs 63, 67 within their respective housings when the connector is uncoupled. The rotation of the coupling collar 15 will not twist any other parts of my connector.

I have found it convenient to provide my connectors with several sets of interchangeable plugs 63, 67 so that they may be used with cables having different numbers and/or sizes of conductors. I have also found it convenient to have available grommets 51, washers 53, and housing caps 55 for cables of several different diameters. Hence, my connectors may be used, by interchanging some of the parts, with different cables from time to time.

I claim:

1. In a cable connector, a substantially tubular housing, closure means for one end of said housing, said closure means including an outwardly extending protuberance on said housing, a housing cap, a resilient finger on said cap which may be slipped over said protuberance for the attachment of said cap to the said end of the housing and for the removal thereof, a substantially annular packing grommet, a washer within the end of said housing, the inner periphery of said washer being rounded, a cable clamp secured to said housing cap and projecting longitudinally therefrom, a cable extending within said grommet, said washer and said cable clamp, said grommet being pressed snugly against said housing and said cable upon attachment of the cap to said housing, and the cable clamp being adapted to support the cable at a point longitudinally spaced from the grommet, said connector maintaining said cable within said housing in a substantially waterproof condition and substantially free from twisting and strain.

2. In a connector for electric cable, a substantially tubular female housing, a substantially tubular male housing, each of said housings having inner and outer end portions, the inner end portion of the male housing being longitudinally slidable into the inner end portion of the female housing, a substantially annular packing gasket, means to retain said gasket snugly against the inner end portions aforesaid of the two housings, two substantially tubular housing caps, one encircling the outer end portion of the female housing and the other encircling the outer end portion of the male housing, a resilient annular grommet within each of said housing caps, a cable extending through each of said grommets, means to retain said grommets snugly against the outer end portions of the female and male housings respectively and also against said cables respectively, said means including a resilient finger secured to each of said housing caps adapted to slide upon and grip said male and female housings respectively, and a cable clamp secured to each of said housing caps and provided with means to grip one of said cables to a point longitudinally spaced from one of said grommets.

3. A cable connector comprising a tubular male housing; a tubular female housing; each housing having an inner end portion and an outer end portion; the inner end portion of the male housing, when in operable position, being axially disposed within the inner end portion of the female housing; means to allow longitudinal movement and to prevent rotational movement of the housings relative to each other; an annular gasket encircling said male housing; a coupling collar, encircling said housings and said gasket, which may retain said housings in their operable positions and press said gasket against the inner end portions of said housings so as to form a snug joint therebetween; an annular grommet at each of the outer end portions of the housings aforesaid; a cable extending into each of said grommets; means to press each of said grommets against one of the outer end portions aforesaid and one of the cables aforesaid so as to form snug joints between said housings and said cables, each of said last named means comprising a housing cap slidable longitudinally into its operable position about the outer end of one of the housings aforesaid, resilient means to provide frictional engagement between said housing and said housing cap so as to retain said cap in its operable position upon said housing, and a cable clamp secured to said housing cap and including gripping elements adapted to grip one of said cables at a point spaced longitudinally from one of the grommets aforesaid.

4. The combination as set forth in claim 3, wherein there is an electrical plug within each of the housings aforesaid; and means to retain said plugs therein and prevent said plugs from rotational movement therein; said plugs being electrically connectable upon operational positioning of the two housings aforesaid.

5. A cable connector comprising a tubular male housing; a tubular female housing; the said housings being coaxially disposed and the inner end of the former extending within the inner end of the latter; said male and female housings being slidable longitudinally relative to each other; means to prevent relative rotational movement between said housings; electrical plug members within said housings; said plug members being slidable longitudinally within said housings; means to limit said longitudinal movement of said plug members toward the outer ends of said housings; means to prevent rotational movement of said plug members respectively relative to said housings; a coupling collar encircling the inner end portions of said housings; a nonuniform pitch, screw thread type cam embossed outwardly from said female housing, its pitch being least at the end of said cam nearest the outer end of said female housing; a flange embossed inwardly from said coupling collar adapted to cooperate with said cam; means on said male housing and said coupling collar to coact to limit the longitudinal movement of said collar relative to said male housing toward the inner end of said male housing; an annular resilient gasket disposed within said coupling collar and about said male housing, adapted to be urged against said male housing and the inner end of the female housing to form a substantially watertight seal between said housings, upon rotation of the coupling collar and cooperation between the cam and flange aforesaid; substantially tubular housing caps adapted respectively to slide longitudinally over the outer ends of the male and female housings; resilient frictional engaging means to retain said housing caps respectively upon said housings; an annular grommet disposed coaxially within each of said housing caps; a cable extending longitudinally through each of said housing caps and said grommets; each of said grommets being urged against its associated cable and the outer end of its associated housing in order to effect a substantially waterproof seal between said cable and housing when its associated housing cap is in position upon said housing; a cable clamp secured to each of said caps, each of said clamps including gripping means to grip one of said cables at a point spaced longitudinally from its associated grommet; the coupling collar, housings, housing caps and cable clamps all being metal stampings.

6. A cable connector, comprising a substantially tubular housing, an electrical plug within said housing, means to retain said plug within said housing, means to prevent said plug from rotating relative to said housing, a housing cap removably attached to said housing, a resilient finger on said cap to allow said cap to be attached to or detached from said housing by merely sliding them relatively longitudinally, an inlet through said housing cap, a cable through said inlet and electrically connected to said plug, a resilient grommet encircling said cable, said grommet maintained by said cap and resilient finger in snug contact with said housing and with said cable so as to form a substantially waterproof seal between said housing and said cable, an insulating bushing, a washer having a rounded surface on its inner periphery and encircling said cable and abutting against said grommet, said insulating bushing and said washer being disposed between the plug and the grommet, and a cable clamp secured to said housing cap and provided with means to grip said cable at a point longitudinally spaced from said grommet.

WILLIAM I. KELLY.